(12) United States Patent
Guarda et al.

(10) Patent No.: US 10,414,861 B2
(45) Date of Patent: Sep. 17, 2019

(54) ZWITTERIONIC DERIVATIVES OF (PER)FLUOROPOLYETHERS

(71) Applicant: SOLVAY SPECIALTY POLYMERS ITALY S.P.A., Bollate (IT)

(72) Inventors: Pier Antonio Guarda, Arese (IT); Simonetta Antonella Fontana, Milan (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 77 days.

(21) Appl. No.: 15/528,025

(22) PCT Filed: Nov. 18, 2015

(86) PCT No.: PCT/EP2015/076990
§ 371 (c)(1),
(2) Date: May 18, 2017

(87) PCT Pub. No.: WO2016/079195
PCT Pub. Date: May 26, 2016

(65) Prior Publication Data
US 2018/0312631 A1 Nov. 1, 2018

(30) Foreign Application Priority Data
Nov. 19, 2014 (EP) .................................... 14193942

(51) Int. Cl.
| | |
|---|---|
| *C08G 65/00* | (2006.01) |
| *C08G 65/332* | (2006.01) |
| *C08G 65/333* | (2006.01) |
| *C08G 59/50* | (2006.01) |
| *C08G 18/18* | (2006.01) |
| *C08G 65/334* | (2006.01) |

(52) U.S. Cl.
CPC ....... *C08G 65/007* (2013.01); *C08G 65/3322* (2013.01); *C08G 65/3324* (2013.01); *C08G 65/3328* (2013.01); *C08G 65/3346* (2013.01); *C08G 65/33306* (2013.01); *C08G 2650/04* (2013.01); *C08G 2650/38* (2013.01); *C08G 2650/48* (2013.01); *C08G 2650/50* (2013.01)

(58) Field of Classification Search
CPC .............. C08G 65/007; C08G 65/3328; C08G 65/33306; C08G 2650/50; C08G 2650/04; C08G 2650/48; C08G 65/3334; C08G 65/33396; C08G 18/1883; C08G 59/504
See application file for complete search history.

(56) References Cited

U.S. PATENT DOCUMENTS

| | | |
|---|---|---|
| 6,225,367 B1 | 5/2001 | Chaouk et al. |
| 6,509,509 B2 | 1/2003 | Tonelli et al. |
| 2001/0037001 A1 | 11/2001 | Muller et al. |
| 2005/0228120 A1 | 10/2005 | Hughes et al. |

FOREIGN PATENT DOCUMENTS

| | | | |
|---|---|---|---|
| EP | 1364663 A1 | 11/2003 | |
| EP | 1614703 A | 1/2006 | |
| EP | 1810987 A | 7/2007 | |
| EP | 1980583 A1 | 10/2008 | |
| WO | 0015686 A1 | 3/2000 | |
| WO | 2010009191 A2 | 1/2010 | |
| WO | WO 2010/009191 A2 * | 1/2010 | ........... C07C 309/07 |
| WO | 2014090649 A1 | 6/2014 | |

OTHER PUBLICATIONS

Chan, G.Y.N. et al., "Approaches to improving the biocompatibility of porous perfluoropolyethers for ophthalmic applications", Biomaterials, 2006, vol. 27, No. 8, p. 1287-1295.—Elsevier Science Publishers BV., Barking, GB-ISSN 0142-9612.

* cited by examiner

*Primary Examiner* — Robert D Harlan

(57) ABSTRACT

(Per)fluoropolyether polymers comprising a (per)fluoropolyether chain having two ends, wherein one or both ends comprise one or more zwitterionic groups at one or both polymer ends, methods for their manufacture and uses thereof are herein disclosed. The polymers can be used in particular for protecting materials in contact with biological fluids or fluids containing biological material from contamination by organic compounds therein contained.

11 Claims, No Drawings

ZWITTERIONIC DERIVATIVES OF (PER)FLUOROPOLYETHERS

CROSS REFERENCE TO RELATED APPLICATIONS

This application is a U.S. national stage entry under 35 U.S.C. § 371 of International Application No. PCT/EP2015/076990 filed Nov. 18, 2015, which claims priority to European application No. 14193942.1 filed on Nov. 19, 2014. The entire contents of these applications are explicitly incorporated herein by this reference.

TECHNICAL FIELD

The present invention relates to zwitterionic derivatives of (per)fluoropolyethers (PFPE), in particular to mono- and bifunctional zwitterionic derivatives of PFPE, to methods for their manufacture and to uses of such derivatives.

BACKGROUND ART (Per)fluoropolyethers (PFPE) are fluorinated polymers comprising a straight or branched fully or partially fluorinated polyoxyalkylene chain that contains recurring units having at least one catenary ether bond and at least one fluorocarbon moiety. The most widespreadly known PFPE can be obtained by homopolymerization of hexafluoropropylene oxide (HFPO) or 2,2,3,3-tetrafluorooxetane and by photooxidation of tetrafluoroethylene (TFE) and/or hexafluoropropylene (HFP).

PFPE can be divided into non-functional and functional; the former comprise a PFPE chain whose ends bear (per)haloalkyl groups, while the latter comprise a PFPE chain having at least two ends, wherein at least one end comprises a functional group. Functional PFPEs, in particular mono- and bifunctional PFPE, i.e. those comprising a PFPE chain having two ends, wherein one or both end(s) bear(s) a functional group, have a variety of industrial uses, which depend on the structure and molecular weight of the PFPE chain and on the nature of the functional group. For example, mono- and bifunctional PFPE are used as ingredients or additives in lubricant compositions, coating compositions for imparting hydro-/oleo-repellence to substrates, or as intermediates or building blocks for the manufacture of other polymers.

Among functional PFPE, those bearing zwitterionic groups are known in the art.

For example, U.S. Pat. No. 6,225,367 B (NOVARTIS AG) 1 May 2001 relates to polymers comprising one or more PFPE units, in particular $CF_2CF_2O$ and $CF_2O$ units, and one or more different charged units, including zwitterionic units, a process for their manufacture and mouldings composed of such polymers. The polymers are useful for the manufacture of biomedical devices, in particular for ophthalmic devices. The polymers disclosed in this document are obtained, for example, by copolymerizing one or more macromonomers comprising at least one PFPE unit with at least one polymerizable charged monomer or precursor thereof that may comprise a zwitterionic group. However, the description and the examples refer only to the PFPE macromonomers containing more than one PFPE units.

US 2001037001 A (NOVARTIS AG) 1 Oct. 2011 relates to a cross-linkable copolymers obtainable by:
(a) copolymerizing at least one hydrophilic monomer having one ethylenically unsaturated double bond and at least one crosslinker comprising two or more ethylenically unsaturated double bonds in the presence of a chain transfer agent having a functional group; and
(b) reacting one or more functional groups of the resulting copolymer with an organic compound having an ethylenically unsaturated group.

A suitable crosslinker is a perfluoroalkyl polyether, for example a macromer of formula:

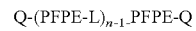

wherein:
Q is a cross-linkable group;
L is a difunctional moiety able to react with hydroxyl;
n is equal to or higher than 1; and
PFPE is a perfluorinated polyether of formula:

Suitable hydrophilic monomers to be reacted with the cross-linker include mono-ethylenically unsaturated compounds comprising a zwitterionic substituent.

The cross-linkable copolymers disclosed in this document are said to be useful for the manufacture of biomedical mouldings, in particular ophthalmic mouldings like contact lenses.

US 2005228120 A (COMMW SCIENT & IND RES) 13 Oct. 2013 discloses, inter alia, a polymer comprising one or more macromonomer PFPE units (in particular straight PFPE chains consisting of $CF_2CF_2O$ and $CF_2O$ units) and one or more charged units, including zwitterionic units that can be comprised in aliphatic, cycloaliphatic or heterocylic moieties.

CHAN, G. Y. N., et al. Approaches to improving the biocompatibility of porous perfluoropolyethers for ophthalmic applications. Biomaterials. 2006, vol. 27, no. 8, p. 1287-1295. discloses (page 1288, par. "Perfluoropolyether (PFPE) membrane preparation") a method for preparing PFPE membranes by photo-copolymerization of a zwitterionic monomer and a PFPE macromonomer comprising polymerizable groups. Thus, the polymer membranes contain more PFPE units and more zwitterionic units.

None of the above documents discloses mono- or bifunctional PFPE comprising one PFPE chain having zwitterionic groups at one or both ends of the chain.

WO 2010/009191 (3M INNOVATIVE PROPERTIES COMPANY) discloses compounds that have partially fluorinated polyether groups and/or fully fluorinated polyether groups with a low number (e.g., up to 4) continuous perfluorinated carbon atoms. The compounds may be useful, for example, as surfactants or surface treatments.

SUMMARY OF INVENTION

The present invention relates to zwitterionic derivatives of (per)fluoropolyethers (PFPE). i.e. to polymers [herein after otherwise referred to as "polymers (P)"] comprising a PFPE chain having two ends, wherein one or both ends comprise(s) at least one zwitterionic group. Preferably, the one or both ends comprise one zwitterionic group.

For the sake of clarity, polymers (P) do not comprise zwitterionic groups or other functional groups along the PFPE chain.

Thanks to the presence of the PFPE chain and to the presence of the one or more zwitterionic group, the polymers of the invention can be used as ingredients or additives in compositions useful to avoid contamination by organic compounds or to promote the release of organic compounds, for example in compositions used for the manufacture of biomedical devices, like implants or catheters, or in compositions for coating substrates in contact with fluids that contain organic biological materials.

GENERAL DEFINITIONS, SYMBOLS AND ABBREVIATIONS

For the purposes of the present description:

the term "(per)fluoropolyether" stands for a fully or partially fluorinated polyether;

the acronym "PFPE" stands for "(per)fluoropolyether"; when this acronym is used as substantive, it is to be intended in the singular or in the plural form, depending on the context;

the use of parentheses "( . . . )" before and after symbols or numbers identifying compounds, chemical formulae or parts of formulae, has the mere purpose of better distinguishing those symbols or numbers from the rest of the text; thus, said parentheses could also be omitted. For example, "chain $(R_f)$" is equivalent to "chain $R_f$";

a non-functional PFPE is a polymer comprising a PFPE chain having two ends, both ends terminating with (per)haloalkyl groups;

a monofunctional PFPE is a polymer comprising a PFPE chain having two ends, one end comprising one or more functional groups and the other end terminating with a (per)haloalkyl group; in the monofunctional polymers according to the invention, the one or more functional group is a zwitterionic group;

a bifunctional PFPE is a polymer comprising a PFPE chain having two ends, each end comprising one or more functional groups; in the bifunctional polymers according to the invention, the one or more functional group is a zwitterionic group;

a (per)haloalkyl group is a straight or branched alkyl group wherein one or more hydrogen atoms have been replaced with halogen atoms;

the term "halogen" includes fluorine, chlorine, bromine or iodine;

the expression "zwitterionic group" (also referred to as "inner salt") indicates a neutral molecule bearing a positive charge and a negative charge in the same molecule, in other words molecules that are electrically neutral overall but contain nonadjacent regions of positive and negative charges linked via covalent bonds;

average functionality (F) represents the average number of functional groups per polymer molecule and can be calculated according to methods known in the art, for example as disclosed in EP 1810987 A (SOLVAY SOLEXIS S.P.A.) 25 Jul. 2007;

"aromatic" means any cyclic moiety having a number of π electrons equal to 4n+2, wherein n is 0 or any positive integer.

Preferably, in the present description, a bifunctional PFPE polymer has a functionality (F) equal to or higher than 1.80, while a monofunctional polymer has a functionality lower than 1.1.

For the sake of clarity, unless stated otherwise, aspects of the invention [e.g. methods of manufacture of polymers (P) or compositions comprising polymers (P)] disclosed in the present description with reference to more generic definitions of polymers (P) given in preceding parts of the description include all preferred definitions of polymers (P) given in preceding parts of the description.

Polymers (P)

Polymers (P) according to the present invention comprise a straight or branched fully or partially fluorinated polyoxy-alkylene chain [herein after also referred to as "PFPE chain $(R_f)$" or "chain $(R_f)$"] that comprises, preferably consists of, repeating units $(R°)$, said repeating units being independently selected from the group consisting of:

(i) —CFXO—, wherein X is F or $CF_3$, (ii) —CFXCFXO—, wherein X, equal or different at each occurrence, is F or $CF_3$, with the proviso that at least one of X is —F, (iii) —$CF_2CF_2CW_2O$—, wherein each of W, equal or different from each other, are F, Cl, H, (iv) —$CF_2CF_2CF_2CF_2O$—, (v) —$(CF_2)_j$—CFZ—O— wherein j is an integer from 0 to 3 and Z is a group of general formula —$OR'_f$T, wherein $R'_f$ is a fluoropolyoxyalkene chain comprising a number of repeating units from 0 to 10, said recurring units being chosen among the followings: —CFXO—, —$CF_2CFXO$—, —$CF_2CF_2CF_2O$—, —$CF_2CF_2CF_2CF_2O$—, with each of each of X being independently F or $CF_3$ and T being a $C_1$-$C_3$ perfluoroalkyl group.

Preferably, chain $(R_f)$ complies with the following formula:

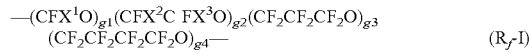

$$—(CFX^1O)_{g1}(CFX^2C\ FX^3O)_{g2}(CF_2CF_2CF_2O)_{g3}(CF_2CF_2CF_2CF_2O)_{g4}— \quad (R_f\text{-I})$$

wherein:

$X^1$ is independently selected from —F and —$CF_3$, $X^2$, $X^3$, equal or different from each other and at each occurrence, are independently —F, —$CF_3$, with the proviso that at least one of X is —F;

g1, g2, g3, and g4, equal or different from each other, are independently integers ≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, chain $(R_f)$ is selected from chains of formula:

$$—(CF_2CF_2O)_{a1}(CF_2O)_{a2}— \quad (R_f\text{-IIA})$$

wherein:

a1 and a2 are independently integers ≥0 such that the number average molecular weight is between 400 and 10,000, preferably between 400 and 5,000; both a1 and a2 are preferably different from zero, with the ratio a1/a2 being preferably comprised between 0.1 and 10;

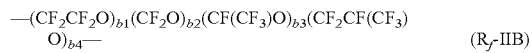

$$—(CF_2CF_2O)_{b1}(CF_2O)_{b2}(CF(CF_3)O)_{b3}(CF_2CF(CF_3)O)_{b4}— \quad (R_f\text{-IIB})$$

wherein:

b1, b2, b3, b4, are independently integers ≥0 such that the number average molecular weight is between 400 and 10,000, preferably between 400 and 5,000; preferably b1 is 0, b2, b3, b4 are >0, with the ratio b4/(b2+b3) being ≥1;

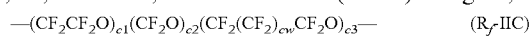

$$—(CF_2CF_2O)_{c1}(CF_2O)_{c2}(CF_2(CF_2)_{cw}CF_2O)_{c3}— \quad (R_f\text{-IIC})$$

wherein:

cw=1 or 2;

c1, c2, and c3 are independently integers ≥0 chosen so that the number average molecular weight is between 400 and 10,000, preferably between 400 and 5,000; preferably c1, c2 and c3 are all >0, with the ratio c3/(c1+c2) being generally lower than 0.2;

$$—(CF_2CF(CF_3)O)_d— \quad (R_f\text{-IID})$$

wherein:

d is an integer >0 such that the number average molecular weight is between 400 and 10,000, preferably between 400 and 5,000;

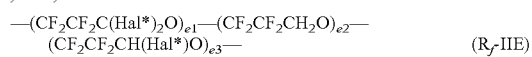

$$—(CF_2CF_2C(Hal^*)_2O)_{e1}—(CF_2CF_2CH_2O)_{e2}—(CF_2CF_2CH(Hal^*)O)_{e3}— \quad (R_f\text{-IIE})$$

wherein:
Hal*, equal or different at each occurrence, is a halogen selected from fluorine and chlorine atoms, preferably a fluorine atom;
e1, e2, and e3, equal to or different from each other, are independently integers ≥0 such that the (e1+e2+e3) sum is comprised between 2 and 300.

Still more preferably, chain ($R_f$) complies with formula ($R_f$-III) here below:

—(CF$_2$CF$_2$O)$_{a1}$(CF$_2$O)$_{a2}$—     ($R_f$-III)

wherein:
a1, and a2 are integers >0 such that the number average molecular weight is between 400 and 10,000, preferably between 400 and 5,000, with the ratio a2/a1 being generally comprised between 0.1 and 10, more preferably between 0.2 and 5.

The zwitterionic group ($Z^W$) is usually a straight or branched alkyl group, preferably a $C_1$-$C_{20}$ alkyl group, optionally partially unsaturated and optionally containing at least one heteroatom selected from nitrogen, oxygen and sulfur, an optionally partially unsaturated cycloaliphatic ring or an aromatic ring containing a cationic and an anionic group. For the purpose of the present description, the cycloaliphatic or aromatic ring is typically a 5- to 7-member ring which may also contain one or more heteroatoms selected from nitrogen, oxygen and sulphur and which can optionally be substituted with non-ionic substituents like halogens, straight or branched $C_1$-$C_4$ alkyl or $C_1$-$C_4$ alkoxy groups. Preferred zwitterionic groups include an ammonium or a phosphonium group and an anionic group selected from carboxylate, sulfonate and phosphate. Further preferred zwitterionic groups are those comprising a N-oxide group. According to a preferred embodiment, the zwitterionic group is an aminoacid group; more preferably, the zwitterionic group is a carboxybetaine, i.e. a zwitterionic group including a quaternary ammonium group and a carboxylate group.

In the polymers of the invention, a zwitterionic group ($Z^W$) is linked to chain ($R_f$) via a spacer group [herein after also referred to as ($S^p$)], which is typically a straight or branched divalent alkylene chain comprising at least two carbon atoms, optionally comprising one or more double bonds and/or one or more heteroatoms and/or functional groups and/or cycloaliphatic or aromatic rings as defined above. The one or more heteroatoms, functional groups, cycloaliphatic or aromatic rings can either interrupt the alkylene chain or be part of pendant groups on the same; preferably, they interrupt the alkylene chain. Preferably, the alkylene chain is interrupted by one or more heteroatoms or functional groups independently selected from one or more of —S—, —O—, —NR$^1$—, —C(O)NR$^1$— wherein R$^1$ is H or straight or branched $C_1$-$C_4$ alkyl, —C(O)—, —C(O)O—, —C(O)S—, —NH(CO)NH—, —NH(CS)NH—, —OC(O) NH— or by a phenyl ring optionally substituted with one or more non-ionic substituents as defined above.

Preferred polymers according to the present invention comply with general formula (P-I) here below:

A—O—$R_f$—$S^p$—$Z^w$     (P-I)

wherein:
$R_f$ is a PFPE chain as defined above, preferably a PFPE chain of formula ($R_f$-III) as defined above;
$S^p$ is a spacer group as defined above;
$Z^W$ is a zwitterionic group as defined above;

A is $S^p$—$Z^W$ or is a C1-C3 haloalkyl group, typically selected from —CF$_3$, —CF$_2$Cl, —CF$_2$CF$_2$Cl, —C$_3$F$_6$Cl, —CF$_2$Br, —CF$_2$CF$_3$, —CF$_2$H and —CF$_2$CF$_2$H.

More preferably, according to the present invention the polymers of formula (P-I) have an average functionality (F) of at least 1.85.

Preferred spacers ($S^p$) comply with any one of formulae ($S^p$-I)-($S^p$-V) here below:

—CFXCH$_2$[OCH$_2$CH(J)]$_x$—$S^{p*}$—;    ($S^p$-I)

—CFXC(O)O—$S^{p**}$—;    ($S^p$-II)

—CFXC(O)NR$^1$—$S^{p**}$—;    ($S^p$-III)

—CFXCH$_2$[OCH$_2$CH(J)]$_x$O—CH$_2$CH(OH) CH$_2$NR$^1$—$S^{p**}$—;    ($S^p$-IV)

—CFXCH$_2$—[OCH$_2$CH(J)]$_x$O—C(O)NHR$^2$NHC(O) NR$^1$—$S^{p**}$—;    ($S^p$-V)

—CFXCH$_2$—[OCH$_2$CH(J)]$_x$O—C(O)NHR$^2$NHC(O) O—$S^{p**}$—;    ($S^p$-VI)

—CFXCH$_2$—[OCH$_2$CH(J)]$_x$—OCH$_2$C(O)NH— $S^{p**}$—;    ($S^p$-VII)

—CFXCH$_2$—[OCH$_2$CH(J)]$_x$OCH$_2$C(O)O—$S^{p**}$—;    ($S^p$-VIII)

—CFXCH$_2$[OCH$_2$CH(J)]$_x$—O—Ar$^{hal}$—O—$S^{p**}$—    ($S^p$-IX)

wherein:
J is independently selected from hydrogen, methyl and ethyl;
x is 0 or a positive number ranging from 1 to 10;
R$^1$ is as defined above;
R$^2$ is a $C_1$-$C_6$ straight or branched divalent alkylene chain or a cycloaliphatic or aromatic ring optionally substituted with one or more $C_1$-$C_4$ straight or branched alkyl groups;
$S^{p*}$ is a bond or a straight or branched divalent alkylene chain as defined above, preferably comprising from 2 to 20 carbon atoms, optionally comprising one or more double bonds and/or one or more heteroatoms and/or functional groups and/or cycloaliphatic or aromatic rings as defined above;
$S^{p**}$ is a straight or branched divalent alkylene chain as defined above, preferably comprising from 2 to 20 carbon atoms, optionally comprising one or more double bonds and/or one or more heteroatoms and/or functional groups and/or cycloaliphatic or aromatic rings as defined above;
Ar$^{hal}$ is an aromatic ring substituted with at least one halogen atom; preferably, Ar$^{hal}$ is a phenyl or biphenyl moiety substituted with at least one fluorine atom. Most preferably, Ar$^{hal}$ complies with formula (Ar$^{hal}$-1):

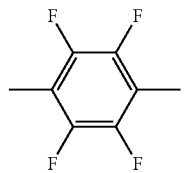

(Ar$^{hal}$-1)

Preferably, in formulae ($S^p$-I)-($S^p$-IX) above, X is F and J is H.

Preferably, in formula (S$^p$-I), x is 1 or 2, while in formulae (S$^p$-IV)-(S$^p$-IX), x is selected from 0, 1 and 2. In one preferred embodiment, x is 0.

More preferably, spacers (S$^p$) comply with formulae (S$^p$-I) and (S$^p$-III).

Preferred spacers (S$^p$-I) comply with formula (S$^p$-Ia) here below:

$$—CF_2CH_2(OCH_2CH_2)_x—S^{p*}— \qquad (S^p\text{-Ia})$$

wherein x is 1 or 2 and S$^{p*}$ is a covalent bond.

Preferred spacers (S$^p$-III) comply with formulae (S$^p$-IIIa) and (S$^p$-IIIb) here below:

$$—CF_2C(O)NH—S^{p**}— \qquad (S^p\text{-IIIa})$$

$$—CF_2C(O)NCH_3—S^{p**}— \qquad (S^p\text{-IIIa})$$

wherein S$^{p**}$ is a straight alkylene chain of formula —(CH$_2$)$_3$—.

Preferred zwitterionic groups (Z$^w$) are selected from formulae (Z$^w$-1) and (Z$^w$-2) here below:

$$\text{-Cat}_1^+\text{-}S^{1zw}\text{-An}^- \qquad (Z^w\text{-1})$$

wherein:
Cat$_1^+$ represents NR'R'', wherein R' and R'', equal to or different from one another, represent C1-C6 straight or branched alkyl;
S$^{1zw}$ is a bond or a straight or branched divalent alkylene chain comprising 1 to 10 carbon atoms, optionally comprising one or more double bonds and/or comprising one or more cycloaliphatic or aromatic rings as defined above;
An$^-$ represents an anionic group selected from —SO$_3$—, —OP(O)(OH)O$^-$, —COO$^-$ and —O$^-$, with the proviso that, when An$^-$ is —O$^-$, S$^{1zw}$ is a bond.

According to a preferred embodiment, R' and R'' are both methyl, S$^{1zw}$ is a straight alkylene chain comprising 1 to 10 carbon atoms and An$^-$ represents a carboxylate anion.

(Z$^w$-2)

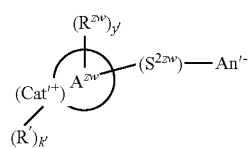

wherein:
A$^{zw}$ represents a heterocycloaliphatic or aromatic ring that comprises Cat'$^+$ and from 4 to 6 carbon atoms;
Cat'$^+$ represents a quaternary nitrogen;
k' is 0 or 1, with the proviso that k' is 0 when A$^{zw}$ is an aromatic ring;
R$^{zw}$ represents a C1-C4 alkyl or C1-C4 alkoxy group;
y' is an integer from 1 to 3 if A$^{zw}$ comprises 4 carbon atoms or from 1 to 5 if A$^{zw}$ comprises 6 carbon atoms;
S$^{2zw}$ represents a covalent bond or a C1-C4 straight or branched alkyl chain;
An'$^-$ is an anionic group selected from —SO$_3$—, —OP(O)(OH)O$^-$ and —COO$^-$, preferably a carboxylate group.

Preferred groups (Z$^w$-1) comply with formula (Z$^w$-1a) here below:

$$—N+(CH_3)_2—S^{zw}—COO^- \qquad (Z^w\text{-1a})$$

wherein S$^{zw}$ is —CH$_2$— or —CH$_2$CH$_2$—.

Preferred groups (Z$^w$-2) comply with formulae (Z$^w$-2a) and (Z$^w$-2b) here below:

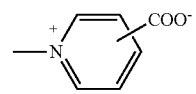 (Z$^w$-2a)

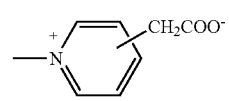 (Z$^w$-2b)

Methods for the Manufacture of Polymers (P)

The polymers according to the present invention can be prepared by methods known in the art starting from a precursor selected from:
a mono- or bifunctional PFPE comprising —OH groups at one or both ends of the PFPE chain (herein after "PFPE alcohol");
a mono- or bifunctional PFPE comprising ester groups at one or both ends of the PFPE chain (herein after "PFPE ester").

Preferred PFPE alcohols comply with formula (A-1) here below:

$$Z—O—R_f—CFXCH_2[OCH_2CH(J)]_xOH \qquad (A\text{-1})$$

wherein:
R$_f$ is a fluoropolyoxyalkylene chain as defined above;
Z is CFXCH$_2$—[CH$_2$CH(J)O]$_x$H wherein J and x are as defined above or a C1-C3 haloalkyl group, typically selected from —CF$_3$, —CF$_2$Cl, —CF$_2$CF$_2$Cl, —C$_3$F$_6$Cl, —CF$_2$Br, —CF$_2$CF$_3$, —CF$_2$H and —CF$_2$CF$_2$H.
X and x are as defined above.

More preferably, chain R$_f$ complies with formula (R$_f$-III) as defined above and X is F. Alcohols of formula (A-1) wherein R$_f$ complies with formula (R$_f$-III) as defined above and x is 0 can be obtained according to known methods; for example, bifunctional PFPE alcohols belonging to this preferred group can be manufactured as disclosed in EP 1614703 A (SOLVAY SOLEXIS S.P.A.) 11 Jan. 2006.

Alcohols of formula (A-1) wherein x is equal to or higher than 1 can be obtained from alcohols (A-1) wherein x is 0 by reaction with ethylene oxide, propylene oxide or 1,2-butylene oxide in the presence of a base. Alcohols (A-1) wherein x ranges from 1 to 10 can be conveniently manufactured with the method disclosed in WO 2014/090649 (SOLVAY SPECIALTY POLYMERS ITALY S.P.A.) 19 Jun. 2014.

Preferred PFPE esters comply with general formula (E) here below:

$$Z'—O—R_f—CF_2—COOR^E \qquad (E)$$

wherein:
R$_f$ is a fluoropolyoxyalkylene chain as defined above;
R$^E$ is a C1-C4 straight or branched alkyl group;
Z' is CF$_2$—COOR$^E$, in which R$^E$ is as defined above, or is a C1-C3 haloalkyl group, typically selected from —CF$_3$, —CF$_2$Cl, —CF$_2$CF$_2$Cl, —C$_3$F$_6$Cl, —CF$_2$Br, —CF$_2$CF$_3$, —CF$_2$H and —CF$_2$CF$_2$H.

More preferably, chain R$_f$ complies with formula (R$_f$-III) as defined above.

Esters (E) wherein chain R$_f$ complies with formula (R$_f$-III) as defined above can be synthesised, for example, as disclosed in EP 1980583 A (SOLVAY SOLEXIS SPA) 15 Oct. 2008, followed by esterification of the resulting acyl fluoride with an alcohol.

Preferred polymers (P-I) comprising a spacer ($S^p$-I) can be manufactured by converting a PFPE alcohol (A-1) into a corresponding sulfonic ester and then by reacting the sulfonic ester with a compound complying with formula:

$$NR''R'—S^{zw}-An^p \qquad (Z^{wp}\text{-}1)$$

wherein R', R" and $S^{zw}$ are as defined above and $An^p$ is a —COOH, —OP(O)(OH)OH and —SO$_3$H, optionally in the form of an ester with a C$_1$-C$_4$ straight of branched alcohol or in the form of a salt with an alkali metal, typically the sodium salt,
or with a compound complying with formula:

($Z^{wp}$-2)

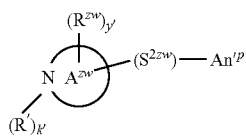
$$(Z^{wp}\text{-}2)$$

wherein R', $R^{zw}$, $A^{zw}$, $S^{2zw}$, $An'^p$, y' and k' are as defined above, followed by hydrolysis if $An^p$ or $An'^p$ are used in the form of ester or salt.

Preferred polymers (P-I) comprising a spacer ($S^p$-II) can be manufactured by reaction of a PFPE ester (E) with an aminoalcohol of formula (A*-1):

$$HO—S^{p**}—NR'R'' \qquad (A^*\text{-}1)$$

wherein $S^{p**}$, R' and R" are as defined above
followed by:
  reaction with a compound complying with formula ($Z^{wp}$-3):

$$Hal-S^{zw}-An^p \qquad (Z^{wp}\text{-}3)$$

wherein Hal is a halogen atom and $S^{zw}$ and $A^{np}$ are as defined above and
  followed by hydrolysis if $An^p$ is in the form of ester or salt.

A preferred compound ($Z^{wp}$-3) is ethyl chloroacetate.

Preferred polymers (P-I) comprising a spacer ($S^p$-III) can be manufactured by reaction of a PFPE ester (E) with a diamine of formula ($A^{dm}$):

$$HNR1-S^{p**}—NR'R'' \qquad (A^{dm})$$

wherein R$^1$, $S^{p**}$, R' and R" are as defined above,
followed by:
  reaction with a compound of formula ($Z^{wp}$-3) and
  followed by hydrolysis if $An^p$ is in the form of ester or salt.

Preferred polymers (P-I) comprising a spacer ($S^p$-IV) can be manufactured by reaction of a PFPE alcohol (A-1) with an epihalohydrin, preferably epichlorohydrin, followed by:
  reaction with diamine of formula ($A^{dm}$);
  reaction with a compound of formula ($Z^{wp}$-3); and
  followed by hydrolysis if $An^p$ is in the form of ester or salt.

Preferred polymers (P-I) comprising a spacer ($S^p$-V) can be manufactured by reaction of a PFPE alcohol (A-1) with a disocyanate of formula ($D^{is}$):

$$O=C=N—R^2—N=C=O \qquad (D^{is})$$

wherein R$^2$ is as defined above,
followed by:
  reaction with diamine of formula ($A^{dm}$);
  reaction with a compound complying with formula ($Z^{wp}$-3); and
  followed by hydrolysis if $An^p$ is in the form of ester or salt.

Preferred polymers (P-I) comprising a spacer ($S^p$-VI) can be manufactured by reaction of a PFPE alcohol (A-1) with a disocyanate of formula ($D^{is}$) followed by:
  reaction with an aminoalcohol of formula (A*-1);
  reaction with a compound of formula ($Z^{wp}$-3) and
  followed by hydrolysis if $An^p$ is in the form of ester or salt.

Preferred polymers (P-I) comprising a spacer ($S^p$-VII) can be manufactured by reaction of a PFPE alcohol (A-1) with ethylchloroacetate, followed by:
  reaction with diamine of formula ($A^{dm}$);
  reaction with a compound of formula ($Z^{wp}$-3) and
  hydrolysis if $An^p$ is in the form of ester or salt.

Preferred polymers (P-I) comprising a spacer ($S^p$-VIII) can be manufactured by reaction of a PFPE alcohol (A-1) with ethylchloroacetate, followed by:
  reaction with an aminoalcohol of formula (A*-1);
  reaction with a compound of formula ($Z^{wp}$-3) and
  followed by hydrolysis if $An^p$ is in the form of ester or salt.

Preferred polymers (P-I) comprising a spacer ($S^p$-IX) can be manufactured by reaction of a PFPE alcohol (A-1) with an aromatic compound bearing at least three halogen atoms, followed by:
  reaction with an aminoalcohol of formula (A*-1);
  reaction with a compound of formula ($Z^{wp}$-3) and
  followed by hydrolysis if $An^p$ is in the form of ester or salt.

The reaction conditions (e.g. solvents, temperatures, etc. . . . ) can be determined on a case by case basis by the person skilled in the art on the basis of the common general knowledge.

Methods of Using the Polymers of the Invention

It has been observed that the polymers of the invention are not soluble in water; indeed, the PFPE chain is hydrophobic and is not soluble in water, while the zwitterionic group(s) present at one or both polymer end are hydrophilic. Therefore, when the polymer is placed in water solutions/compositions, the PFPE chain separates from the aqueous phase, while the zwitterionic groups interact with it. Therefore, when the polymers of the invention are used as coatings on surfaces of materials in contact with aqueous compositions or solutions, the zwitterionic groups tend to migrate to the surface towards the aqueous phase, while the PFPE chain remains in contact with the coated surface. For this reason, the polymers can be used to avoid penetration of the water solution/composition in the material. This is particularly useful in cases where the aqueous composition or solution contains organic materials or contaminants whose penetration through/adherence to said surface is not desired. Therefore, the polymers of the invention can be used ingredients or additives for compositions useful to avoid contamination by organic compounds or to promote the release of organic compounds, for example for compositions used for the manufacture of biomedical devices, like implants or catheters, or for compositions for coating substrates in contact with fluids that contain organic biological materials.

Accordingly, a further aspect of the present invention is represented by compositions comprising one or more polymers according to the invention in admixture with other ingredients, preferably one or more curable resins, more preferably resins independently selected from polysiloxane resins, acrylic resins, polyurethane resins or epoxyamine resins that can be submitted to curing to provide coatings or formed articles.

Should the disclosure of any patents, patent applications and publications which are incorporated herein by reference conflict with the description of the present application to the extent that it may render a term unclear, the present description shall take precedence.

The invention will be herein after illustrated in greater detail in the following Experimental Section by means of non-limiting Examples.

EXPERIMENTAL SECTION

Material and Methods

Starting Material for Example 1

PFPE diester of formula:

$R_f[CF_2C(O)OCH_2CH_3]_2$ (MW=g/mol 1575; F=1,85)

wherein:
$R_f$ is a perfluoropolyoxyalkylene chain of formula $-O(CF_2CF_2O)_{a1}(CF_2O)_{a2}-$, wherein the a1/a2 ratio is equal to 2.1.

Starting Material for Example 2

PFPE diester of formula:

$R_f[CF_2C(O)OCH_2CH_3]_2$ (MW=g/mol 3994; F=1,95; a1/a2=1,1)

wherein:
$R_f$ is a perfluoropolyoxyalkylene chain of formula $-O(CF_2CF_2O)_{a1}(CF_2O)_{a2}-$, wherein the a1/a2 ratio is equal to 1.1.

Starting Material for Example 3

PFPE diol of formula:

$R_f[CF_2CH_2(OCH_2CH_2)_pOH]_2$ (MW=g/mol 1725; F=1.85)

wherein $R_f$ is a perfluoropolyoxyalkylene chain $-O(CF_2CF_2O)_{a1}(CF_2O)_{a2}-$, wherein the a1/a2 ratio is equal to 2.1 and p=1.8.

Starting Material for Example 4

PFPE di-isocyanate of formula

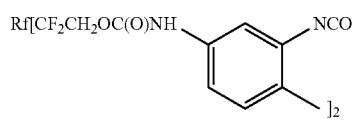

wherein $R_f$ is a perfluoropolyoxyalkylene chain $-O(CF_2CF_2O)_{a1}(CF_2O)_{a2}-$, wherein the a1/a2 ratio is equal to 1.1

(MW=g/mol 2363; F=1.95).

In the above compounds, chain $R_f$ contains also small amounts of $-CF_2CF_2CF_2O-$ and $-CF_2CF_2CF_2CF_2O-$ units.

The diesters were manufactured according to the method disclosed in the aforementioned EP 1980583, followed by esterification of the resulting acyl fluoride with ethanol.

The PFPE diol was manufactured according to the method disclosed in U.S. Pat. No. 6,509,509 (AUSIMONT SPA) 5 Jul. 2001.

The PFPE-diisocyanate was manufactured by reacting the PFPE diol of formula:

$R_f[CF_2CH_2OH]_2$ with an excess of TDI (Toluen diisocyanate) in the presence of DBTDL (dibutyltin dilaurate) and further washing with a proper solvent to eliminate the excess of TDI.

$^1$H-NMR and $^{19}$F-NMR were recorded on a Agilent System 500 operating at 499.86 MHz for $^1$H and 470.30 MHz for $^{19}$F.

FT-IR spectra were measured with a ThermoScientific FTIR spectrophotometer on liquid samples as thin films on KBr. Spectra were acquired by co-adding 256 scans with a resolution of 2 cm$^{-1}$.

Example 1 Synthesis of a Polymer of Formula: $R_f[CF_2C(O)NHCH_2CH_2CH_2N+(CH_3)_2$ $CH_2COO-]_2$ (Wherein $R_f$ is as Defined Above for the Starting PFPE Diester; MW=1785 g/Mol; F=1.85)

A 3-necked round bottom flask with 1 L capacity, equipped with a condenser and a mechanical stirrer, was charged with 200 g (127 mmoles) of the PFPE diester $R_f[CF_2C(O)OCH_2CH_3]_2$ (127 mmoles) and 24 g of dimethylaminopropylamine (MW=102 g/mol; 235 mmoles). The obtained mixture was heated up to 60° C. and let under stirring until complete conversion of the ester functionalities into amido functionalities. The reaction was monitored by means of FT-IR analysis following the disappearance of the $-COOEt$ band at 1790 cm$^{-1}$.

200 g ethanol, 10 g deionized water and 27.3 g sodium chloroacetate (MW=116 g/mol; 235 mmoles) were charged into the flask containing the above prepared amido derivative, the temperature was raised up to 80° C. and the reaction was let under stirring for 8 hrs. Thereafter, 300 g 1,3-bis (trifluoromethyl)benzene, 200 g of water and 100 g isobutyl alcohol were added into the reaction mixture to obtain the separation of two phases. The bottom one (fluorinated phase) was evaporated under vacuum, to provide 223 g of title compound. The structure of the product was confirmed by $^1$H-NMR and $^{19}$F-NMR analyses.

Example 2—Synthesis of a Polymer of Formula: $R_f[CF_2C(O)NHCH_2CH_2CH_2N+(CH_3)_2$ $CH_2COO-]_2$ (Wherein $R_f$ is as Defined Above for the Starting PFPE Diester; MW=4216 g/Mol and F=1.95)

The procedure described in Example 1 was followed by reacting first 200 g (50 mmoles) of starting PFPE diester $R_f[CF_2C(O)OCH_2CH_3]_2$ as defined above with 10 g of dimethylaminopropylamine (MW=102; 98 mmoles) to provide the corresponding amide. The amide was then reacted with 11.3 g of sodium chloroacetate (MW=116; 98 mmoles).

The structure of the title compound was confirmed by $^1$H-NMR and $^{19}$F-NMR analyses.

Example 3—Synthesis of a Polymer of Formula

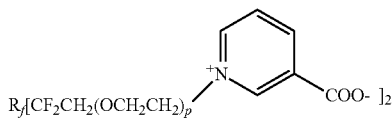

(wherein $R_f$ and p are as defined above for the starting PFPE diol; MW=1950 g/mol and F=1.85)

A 3-necked round bottom flask with 0.5 L capacity, kept under nitrogen atmosphere and equipped with a condenser, a mechanical stirrer and a dropping funnel, was charged with 150 g (87 mmoles) of starting PFPE ethoxylated alcohol of formula $R_f[CF_2CH_2(OCH_2CH_2)_pOH]_2$ as defined above, 70 g $CH_2Cl_2$ and 23 g trietylamine (MW=g/mol 101; 225 mmoles). Thereafter, the flask was refrigerated and 73 g of a 30% w/w solution in $CH_2Cl_2$ of methanesulfonyl chloride (MW=114.5 g/mol; 193 mmoles) were added at such a rate as to keep the temperature in the range of 15-30° C. When the methanesulfonyl chloride addition was complete, the reaction mixture was let under stirring for further 4 hrs.

The reaction mixture was then brought to neutrality by adding a 4M aqueous solution of HCl and the thereby formed organic phase was separated. After distillation of the solvent, 160 g of mesyl derivative of formula: $R_f[CF_2CH_2(OCH_2CH_2)_pOSO_2CH_3]_2$ (MW=1870 g/mol; F=1.85; a1/a2=2.1; p=1.8 and $R_f$ as defined above) were obtained as a limpid liquid characterized by $^1$H-NMR and $^{19}$F-NMR analyses.

100 g (54 mmoles) of the mesyl derivative were dropped into a 3-necked round bottom flask of 0.25 L capacity, equipped with a condenser, a mechanical stirrer and containing 60 g 1,3-bis(trifluoromethyl)benzene and 13.7 g methyl nicotinate (MW=137; 100 mmoles). The resulting mixture was heated up to 90° C. for 8 hrs, dried under vacuum and the obtained residue was treated with 200 g of a 0.5M NaOH aqueous solution at room temperature for 2 hours. Thereafter, 150 g 1,3-bis(trifluoromethyl)benzene, and 50 g of isobutyl alcohol were added into the reaction mixture to obtain the separation of the phases. The bottom one was evaporated under vacuum, to provide 103 g of the title compound. The product structure was confirmed by $^1$H-NMR and $^{19}$F-NMR analyses.

Example 4—Synthesis of a Polymer of Formula

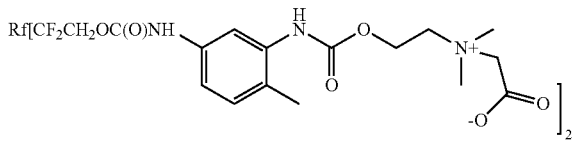

(wherein $R_f$ is as defined above for the starting PFPE di-isocyanate; MW=2650 g/mol: F=1.95)

A 3-necked round bottom flask with 1 L capacity, equipped with a condenser and a mechanical stirrer, was charged with 200 g (85 mmoles) of the starting PFPE diisocyanate having the formula defined above, 100 g of MEK (Methyl Ethyl Ketone) and 15 g (166 mmoles) of N—N'-dimethyl-ethanol amina. The obtained mixture was heated up to 60° C., added with 0.5 ml of 20% solution of DBTDL in MEK and let under stirring until complete conversion of the isocyanate functionalities into urethane functionalities (the reaction was monitored by means of FT-IR analysis following the disappearance of the —NCO band at 2264 cm$^{-1}$). After complete elimination of the MEK by distillation, 150 g of ethanol, 10 g deionized water and 27 g sodium chloroacetate (MW=116 g/mol; 233 mmoles) were charged into the flask containing the above prepared urethane derivative. The temperature was raised up to 80° C. and the reaction was let under stirring for 8 hrs. Thereafter, 270 g 1,3-bis(trifluoromethyl)benzene, 180 g of water and 90 g isobutyl alcohol were added into the reaction mixture to obtain the separation of two phases. The bottom one was evaporated under vacuum, to provide 213 g of title compound. The structure of the product was confirmed by $^1$H-NMR and $^{19}$F-NMR analyses.

The invention claimed is:

1. A polymer comprising a (per)fluoropolyether chain ($R_f$) having two ends, wherein one or both ends comprise(s) at least one zwitterionic group ($Z^w$), wherein each at least one zwitterionic group ($Z^w$) is a group of formula ($Z^w$-1), formula ($Z^w$-2a) or formula ($Z^w$-2b):

$$-Cat_1^+-S^{1zw}-An^- \quad (Z^w\text{-}1)$$

wherein:
  $Cat_1^+$ represents NR'R", wherein R' and R" are each independently methyl;
  $S^{1zw}$ is a straight alkylene chain comprising 1 to 10 carbon atoms; and
  $An^-$ represents —COO—, ($Z^w$-2a):

($Z^w$-2b):

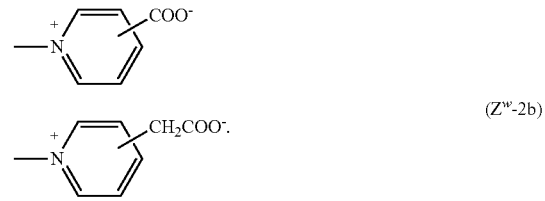

2. The polymer according to claim 1 wherein one or both ends comprise one zwitterionic group ($Z^w$).

3. The polymer according to claim 1 wherein chain ($R_f$) is a straight or branched fully or partially fluorinated polyoxyalkylene chain that comprises repeating units ($R^o$), said repeating units being independently selected from the group consisting of:

(i) —CFXO—, wherein X is F or $CF_3$,
(ii) —CFXCFXO—, wherein X, equal or different at each occurrence, is F or $CF_3$, with the proviso that at least one of X is —F,
(iii) —CF$_2$CF$_2$CW$_2$O—, wherein each of W, equal or different from each other, are F, Cl, H,
(iv) —CF$_2$CF$_2$CF$_2$CF$_2$O—,
(v) —(CF$_2$)$_j$—CFZ—O— wherein j is an integer from 0 to 3 and Z is a group of general formula —OR$_f'$T, wherein R$_f'$ is a fluoropolyoxyalkene chain comprising a number of repeating units from 0 to 10, said recurring units being selected from: —CFXO—, —CF$_2$CFXO—, —CF$_2$CF$_2$CF$_2$O—, and —CF$_2$CF$_2$CF$_2$CF$_2$O—, with each X being independently F or $CF_3$ and T being a $C_1$-$C_3$ perfluoroalkyl group.

4. The polymer according to claim 1 wherein the zwitterionic group ($Z^w$) is linked to chain ($R_f$) via a spacer group ($S^p$) that is a straight or branched divalent alkylene chain comprising at least 2 carbon atoms, interrupted by one or more heteroatoms or functional groups independently selected from one or more of —S—, —O—, —NR$^1$—, —C(O)NR$^1$— wherein R$^1$ is H or straight or branched $C_1$-$C_4$ alkyl, —C(O)—, —C(O)O—, —C(O)S—, —NH(CO)NH—, —NH(CS)NH—, or —OC(O)NH—, or by a phenyl ring optionally substituted with one or more halogens, straight or branched $C_1$-$C_4$ alkyl or $C_1$-$C_4$ alkoxy groups.

5. The polymer according to claim 4 complying with formula (P-I):

A-O—$R_f$—$S^p$—$Z^w$     (P-I)

wherein: $R_f$, S', and —$Z^w$ are as defined in claim 4 and A is $S^p$—$Z^w$ or is a $C_1$-$C_3$ haloalkyl group.

6. The polymer according to claim 1 wherein the spacer group complies with any one of formulae ($S^p$-I) ($S^p$-IX):

—CFXCH$_2$[OCH$_2$CH(J)]$_x$—$S^{p*}$—;     ($S^p$-I)

—CFXC(O)O—$S^{p**}$—;     ($S^p$-II)

—CFXC(O)NR$^1$—$S^{p**}$—;     ($S^p$-III)

—CFXCH$_2$[OCH$_2$CH(J)]$_x$O—CH$_2$CH(OH)CH$_2$NR$^1$—$S^{p**}$—;     ($S^p$-IV)

—CFXCH$_2$—[OCH$_2$CH(J)]$_x$O—C(O)NHR$^2$NHC(O)NR$^1$—$S^{p**}$—;     ($S^p$-V)

—CFXCH$_2$—[OCH$_2$CH(J)]$_x$O—C(O)NHR$^2$NHC(O)O—$S^{p**}$—;     ($S^p$-VI)

—CFXCH$_2$—[OCH$_2$CH(J)]$_x$—OCH$_2$C(O)NH—$S^{p**}$—;     ($S^p$-VII)

—CFXCH$_2$—[OCH$_2$CH(J)]$_x$OCH$_2$C(O)O—$S^{p**}$—;     ($S^p$-VIII)

—CFXCH$_2$[OCH$_2$CH(J)]$_x$—O—Ar$^{hal}$—O—$S^{p**}$—     ($S^p$-IX)

wherein:
J is independently selected from hydrogen, methyl and ethyl;
x is 0 or a positive number ranging from 1 to 10;
R$^1$ is H or straight or branched $C_1$-$C_4$ alkyl;
R$^2$ is a $C_1$-$C_6$ straight or branched divalent alkylene chain or a cycloaliphatic or aromatic ring, optionally substituted with one or more $C_1$-$C_4$ straight or branched alkyl groups;
$S^{p*}$ is a bond or a straight or branched divalent alkylene chain comprising from 2 to 20 carbon atoms, optionally comprising one or more double bonds and/or one or more heteroatoms and/or functional groups and/or cycloaliphatic or aromatic rings;
$S^{p**}$ is a straight or branched divalent alkylene chain comprising from 2 to 20 carbon atoms, optionally comprising one or more double bonds and/or one or more heteroatoms and/or functional groups and/or cycloaliphatic or aromatic rings;
Ar$^{hal}$ is an aromatic ring substituted with at least one halogen atom.

7. The polymer according to claim 6 wherein X is F and J is H.

8. The polymer according to claim 6 wherein the spacer is selected from:
a spacer of formula ($S^p$-Ia):

—CF$_2$CH$_2$(OCH$_2$CH$_2$)$_x$—$S^{p*}$—     ($S^p$-Ia)

wherein x is 1 or 2 and $S^{p*}$ is a covalent bond;
a spacer of formula ($S^p$-IIIa):

—CF$_2$C(O)NH—$S^{p**}$—     ($S^p$-IIIa)

a spacer of formula (SP-IIIb):

—CF$_2$C(O)NCH$_3$—$S^{p**}$—     ($S^p$-IIIa)

wherein $S^{p**}$ is a straight alkylene chain of formula —(CH$_2$)$_3$—.

9. A composition comprising one or more polymers according to claim 1 in admixture with one or more curable resins.

10. The composition according to claim 9 wherein the one or more curable resin is independently selected from polysiloxane resins acrylic resins, polyurethane resins and epoxyamine resins.

11. The polymer according to claim 5 wherein A selected from —CF$_3$, —CF$_2$Cl, —CF$_2$CF$_2$Cl, —C$_3$F$_6$Cl, —CF$_2$Br, —CF$_2$CF$_3$, —CF$_2$H and —CF$_2$CF$_2$H.